United States Patent
Asgekar et al.

(10) Patent No.: US 11,778,064 B2
(45) Date of Patent: Oct. 3, 2023

(54) SYSTEMS AND METHODS FOR GENERATING EDUCATIONAL FLUID MEDIA

(71) Applicant: Pencil Learning Technologies, Inc., Palo Alto, CA (US)

(72) Inventors: Amogh Asgekar, Palo Alto, CA (US); Ayush Agarwal, San Francisco, CA (US)

(73) Assignee: Pencil Learning Technologies, Inc., Palo Alto, CA (US)

(*) Notice: Subject to any disclaimer, the term of this patent is extended or adjusted under 35 U.S.C. 154(b) by 134 days.

(21) Appl. No.: 17/523,839

(22) Filed: Nov. 10, 2021

(65) Prior Publication Data

US 2023/0142052 A1    May 11, 2023

(51) Int. Cl.
| | |
|---|---|
| *H04L 67/5651* | (2022.01) |
| *H04L 67/303* | (2022.01) |
| *H04L 65/60* | (2022.01) |

(52) U.S. Cl.
CPC .......... *H04L 67/5651* (2022.05); *H04L 65/60* (2013.01); *H04L 67/303* (2013.01)

(58) Field of Classification Search
None
See application file for complete search history.

(56) References Cited

U.S. PATENT DOCUMENTS

| | | | | |
|---|---|---|---|---|
| 6,199,082 B1* | 3/2001 | Ferrel | ............. | G06F 16/958 707/E17.116 |
| 7,058,698 B2* | 6/2006 | Chatterjee | ............. | H04L 67/565 709/219 |
| 7,880,909 B2* | 2/2011 | Bukowski | ............. | H04L 67/56 358/1.15 |
| 10,083,215 B2* | 9/2018 | Davis Jones | ......... | G06F 16/258 |
| 10,157,195 B1* | 12/2018 | Panwar | .................. | G06F 16/25 |
| 2001/0037404 A1* | 11/2001 | Hafsteinsson | ........ | H04L 67/565 707/E17.121 |
| 2002/0141442 A1* | 10/2002 | Plain | ........................ | H04L 9/40 370/352 |
| 2003/0172186 A1* | 9/2003 | Dunn | ........................ | H04L 9/40 707/E17.121 |
| 2004/0172484 A1* | 9/2004 | Hafsteinsson | ........ | H04L 67/565 709/230 |

(Continued)

Primary Examiner — Backhean Tiv
(74) Attorney, Agent, or Firm — VOLPE KOENIG P.C.; Daniel E. Rose

(57) ABSTRACT

The present disclosure provides systems and methods for formatting and generating teaching media for different contexts. A system can receive, from a client computing device, media content having one or more media modalities each having presentation attributes. The system can determine initial formatting rules for the media content based on the presentation attributes of the one or more media modalities. The system can identify a destination format for the media content having a formatting requirement for each of the one or more media modalities of the media content. The system can modify the initial formatting rules for the media content based on the formatting requirement for each of the one or more media modalities. The system can generate an information resource having the destination format based on the modified formatting rules for the media content.

20 Claims, 7 Drawing Sheets

(56) References Cited

U.S. PATENT DOCUMENTS

| | | | |
|---|---|---|---|
| 2009/0292987 A1* | 11/2009 | Sorenson | G06F 40/103 |
| | | | 715/255 |
| 2009/0304367 A1* | 12/2009 | Zhang | H04N 5/765 |
| | | | 386/231 |
| 2014/0074894 A1* | 3/2014 | Han | H04N 21/2353 |
| | | | 707/E17.005 |
| 2020/0097302 A1* | 3/2020 | Deutch | G06F 3/04817 |
| 2023/0142052 A1* | 5/2023 | Asgekar | H04L 67/5651 |
| | | | 709/217 |

* cited by examiner

SYSTEMS AND METHODS FOR GENERATING EDUCATIONAL FLUID MEDIA

BACKGROUND

Educators typically create and format teaching media as part of a lesson plan. It can be challenging to efficiently create and format content in multiple different formats for various teaching environments and contexts.

SUMMARY

Conventionally, educators manually create and format multiple teaching media that includes the same, or similar, content. Some example content representations created by teachers or other presenters can include word documents, presentations or slides, online tests, quizzes, assessments, and digital flashcards, among others. The systems and methods of this technical solution leverage common content conventionally used manually by educators, and can automatically generate and format content in teaching media for presentation in a variety of environments.

Educators typically move and format content when creating teaching media for different contexts and new presentation environments. The systems and methods of this technical solution eliminate manual generation of teaching content for different contexts. By applying logic to granularly stored questions, explanatory content, and other teaching media, the systems and methods described herein enable the content to be automatically formatted and converted into multiple media for different teaching environments. This reduces manual intervention for teaching material creation, which can often be inconsistent, inaccurate, or unreliable, and can remove the tedium of certain activities like re-sizing pictures, weighting fonts, optimizing page breaks or generating personalized cover sheets. Thus, the systems and methods described herein improve the generation of teaching media by automatically resizing content, such as images, pictures, and video, as well as selecting formatting parameters for fonts, mathematical formulas and equations, chemical formulas, graphs, and other teaching content automatically. Further, the systems and methods described herein can generate content for a variety of different contexts automatically.

At least one aspect of the present disclosure is directed to a method of generating and formatting multiple teaching media. The method can be performed, for example, by one or more processors coupled to memory. The method can include receiving, from a client computing device, media content comprising one or more media modalities each having a presentation attribute. The method can include determining initial formatting rules for the media content based on the presentation attribute of each of the one or more media modalities. The method can include identifying a destination format for the media content, the destination format comprising a formatting requirement for each of the one or more media modalities. The method can include modifying the initial formatting rules for the media content based on the formatting requirement of the destination format to create modified formatting rules. The method can include generating an information resource having the destination format based on the modified formatting rules for the media content.

In some implementations, identifying the destination format for the media content can include transmitting a set of potential destination formats to the client computing device. In some implementations, identifying the destination format for the media content can include receiving, from the client computing device, a selection of the destination format from the set of potential destination formats. In some implementations, determining the initial formatting rules for the media content further can include identifying a respective portion of the media content corresponding to each of the one or more media modalities. In some implementations, determining the initial formatting rules for the media content further can include determining the initial formatting rules for the respective portion corresponding to each of the one or more media modalities based on a context specified by the client computing device.

In some implementations, the media content can include one or more images. In some implementations, modifying the initial formatting rules for the media content can include determining an adjusted size for the one or more images based on the formatting requirement and an original size of the one or more images. In some implementations, identifying the destination format can include determining a device type on which the destination format will be presented. In some implementations, identifying the destination format can include modifying the initial formatting rules for the media content based on presentation capabilities of the device type on which the destination format will be presented.

In some implementations, the media content specifies preliminary layout information of a plurality of portions of the media content. In some implementations, determining the initial formatting rules is further based on the preliminary layout information. In some implementations, the method can further include identifying second media content associated with second formatting rules and a second presentation attribute, the second media content specified for inclusion in the information resource. In some implementations, the method can further include generating composite formatting rules for the information resource based on the media content and the second presentation attribute and one or more attributes of the information resource. In some implementations, the method can further include generating the information resource to include the media content and the second media content based on the composite formatting rules.

In some implementations, generating the composite formatting rules can include providing, as input to a regression model, the presentation attribute of each of the one or more media modalities, the one or more attributes of the information resource, and the second presentation attribute of the second media content. In some implementations, generating the composite formatting rules can include identifying, as an output of the regression model, a first portion of the composite formatting rules corresponding to the media content, and a second portion of the composite formatting rules corresponding to the second media content. In some implementations, at least one of the one or more media modalities is an image and the presentation attribute of the image is an image size.

In some implementations, modifying the initial formatting rules for the media content can include modifying the image size of the image based on the destination format and other content in the information resource. In some implementations, modifying the initial formatting rules for the media content can include determining maximum and minimum values for the presentation attribute of the one or more media modalities. In some implementations, modifying the initial formatting rules for the media content can include selecting an updated value of the presentation attribute of the one or more media modalities based on the formatting requirement.

At least one other aspect of the present disclosure is directed to a system for generating and formatting multiple teaching media. The system can include one or more processors coupled to memory. The system can receive, from a client computing device, media content comprising one or more media modalities each having a presentation attribute. The system can determine initial formatting rules for the media content based on the presentation attribute of each of the one or more media modalities. The system can identify a destination format for the media content, the destination format comprising a formatting requirement for each of the one or more media modalities. The system can modify the initial formatting rules for the media content based on the formatting requirement of the destination format to create modified formatting rules. The system can generate an information resource having the destination format based on the modified formatting rules for the media content.

In some implementations, the system can identify the destination format for the media content by transmitting a set of potential destination formats to the client computing device. In some implementations, the system can identify the destination format for the media content by receiving, from the client computing device, a selection of the destination format from the set of potential destination formats. In some implementations, the system can determine the initial formatting rules for the media content by identifying a respective portion of the media content corresponding to each of the one or more media modalities. In some implementations, the system can determine the initial formatting rules for the media content by determining the initial formatting rules for the respective portion corresponding to each of the one or more media modalities based on a context specified by the client computing device.

In some implementations, media content can include one or more images. In some implementations, the system can modify the initial formatting rules for the media content by determining an adjusted size for the one or more images based on the formatting requirement and an original size of the one or more images. In some implementations, the system can identify the destination format by determining a device type on which the destination format will be presented. In some implementations, the system can identify the destination format by modifying the initial formatting rules for the media content based on presentation capabilities of the device type on which the destination format will be presented. In some implementations, the media content specifies preliminary layout information of a plurality of portions of the media content. In some implementations, the system can determine the initial formatting rules further based on the preliminary layout information.

In some implementations, the system can identify second media content associated with second formatting rules and a second presentation attribute, the second media content specified for inclusion in the information resource. In some implementations, the system can generate composite formatting rules for the information resource based on the media content and the second presentation attribute and one or more attributes of the information resource. In some implementations, the system can generate the information resource to include the media content and the second media content based on the composite formatting rules.

In some implementations, the system can generate the composite formatting rules by providing, as input to a regression model, the presentation attribute of each of the one or more media modalities, the one or more attributes of the information resource, and the second presentation attribute of the second media content. In some implementations, the system can generate the composite formatting rules by identifying, as an output of the regression model, a first portion of the composite formatting rules corresponding to the media content, and a second portion of the composite formatting rules corresponding to the second media content.

In some implementations, at least one of the one or more media modalities is an image and the presentation attribute of the image is an image size. In some implementations, the system can modify the initial formatting rules for the media content by modifying the image size of the image based on the destination format and other content in the information resource. In some implementations, the system can modify the initial formatting rules for the media content by determining maximum and minimum values for the presentation attribute of the one or more media modalities. In some implementations, the system can modify the initial formatting rules for the media content by selecting an updated value of the presentation attribute of the one or more media modalities based on the formatting requirement.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Below are detailed descriptions of various concepts related to, and implementations of, techniques, approaches, methods, apparatuses, and systems for generating and formatting multiple teaching media. The various concepts introduced above and discussed in greater detail below may be implemented in any of numerous ways, as the described concepts are not limited to any particular manner of implementation. Examples of specific implementations and applications are provided primarily for illustrative purposes For purposes of reading the description of the various implementations below, the following descriptions of the sections of the Specification and their respective contents may be helpful:

Section A describes a network environment and computing environment which may be useful for practicing embodiments described herein; and Section B describes systems and methods for generating and formatting teaching media in multiple formats for different contexts.

A. Computing and Network Environment

Figure 1A:
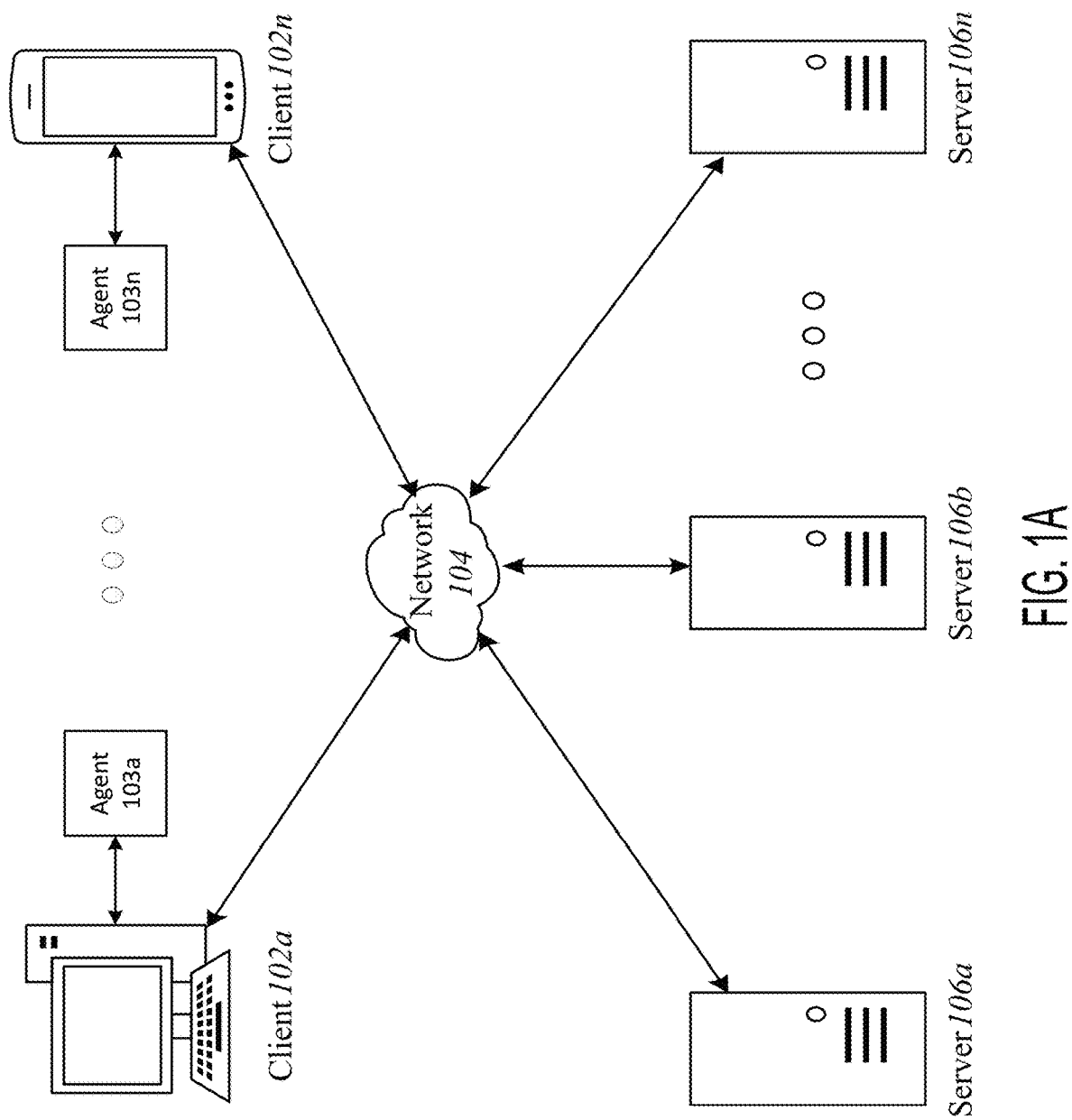
FIG. 1A is a block diagram depicting an embodiment of a network environment comprising a client device in communication with a server device.

Prior to discussing specific implements of the various aspects of this technical solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103a-103n and one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
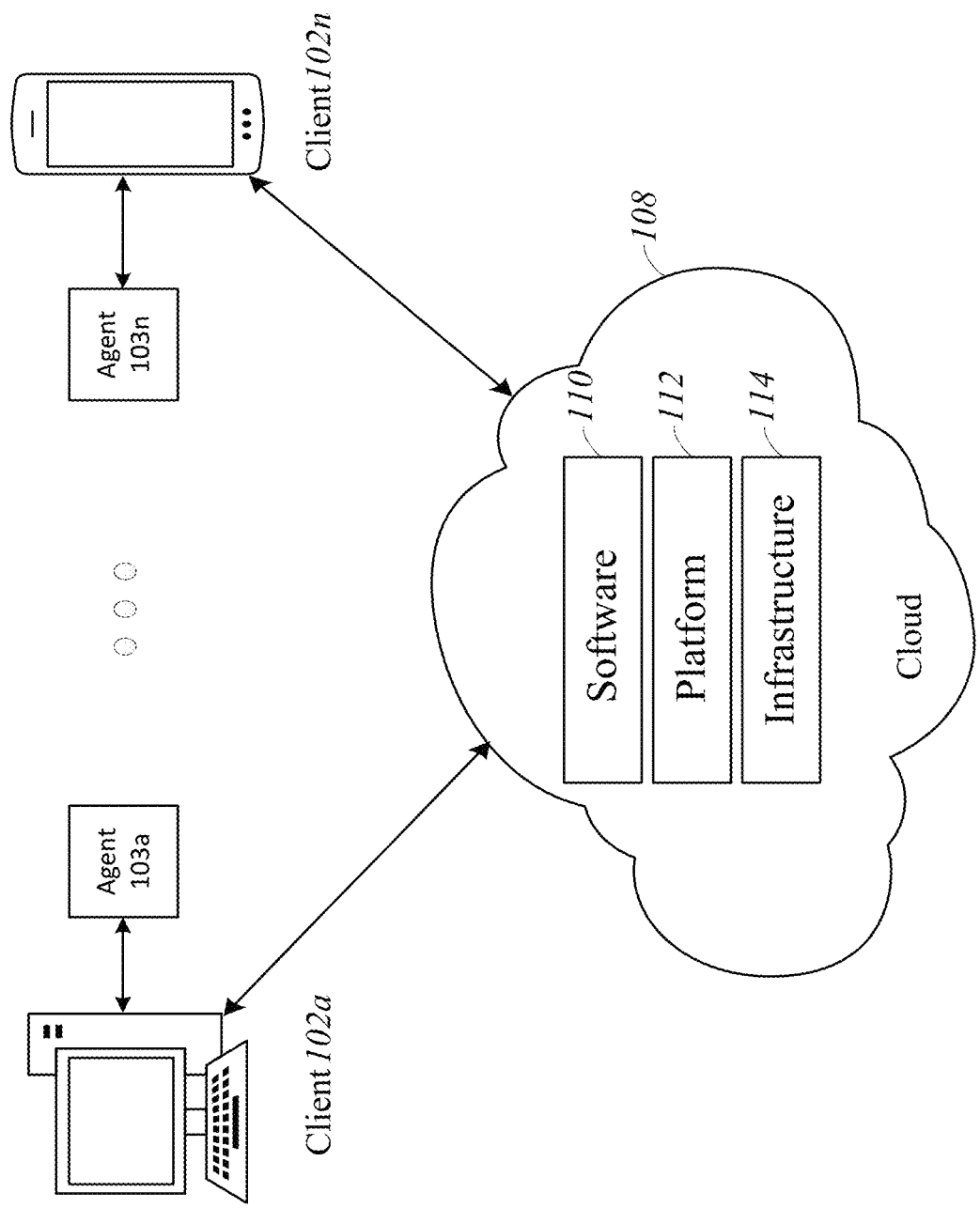
FIG. 1B is a block diagram depicting a cloud computing environment comprising a client device in communication with cloud service providers.

Referring to FIG. 1B, a cloud computing environment is depicted. A cloud computing environment may provide client 102 with one or more resources provided by a network environment. The cloud computing environment may include one or more clients 102*a*-102*n*, in communication with respective agents 103*a*-103*n* and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
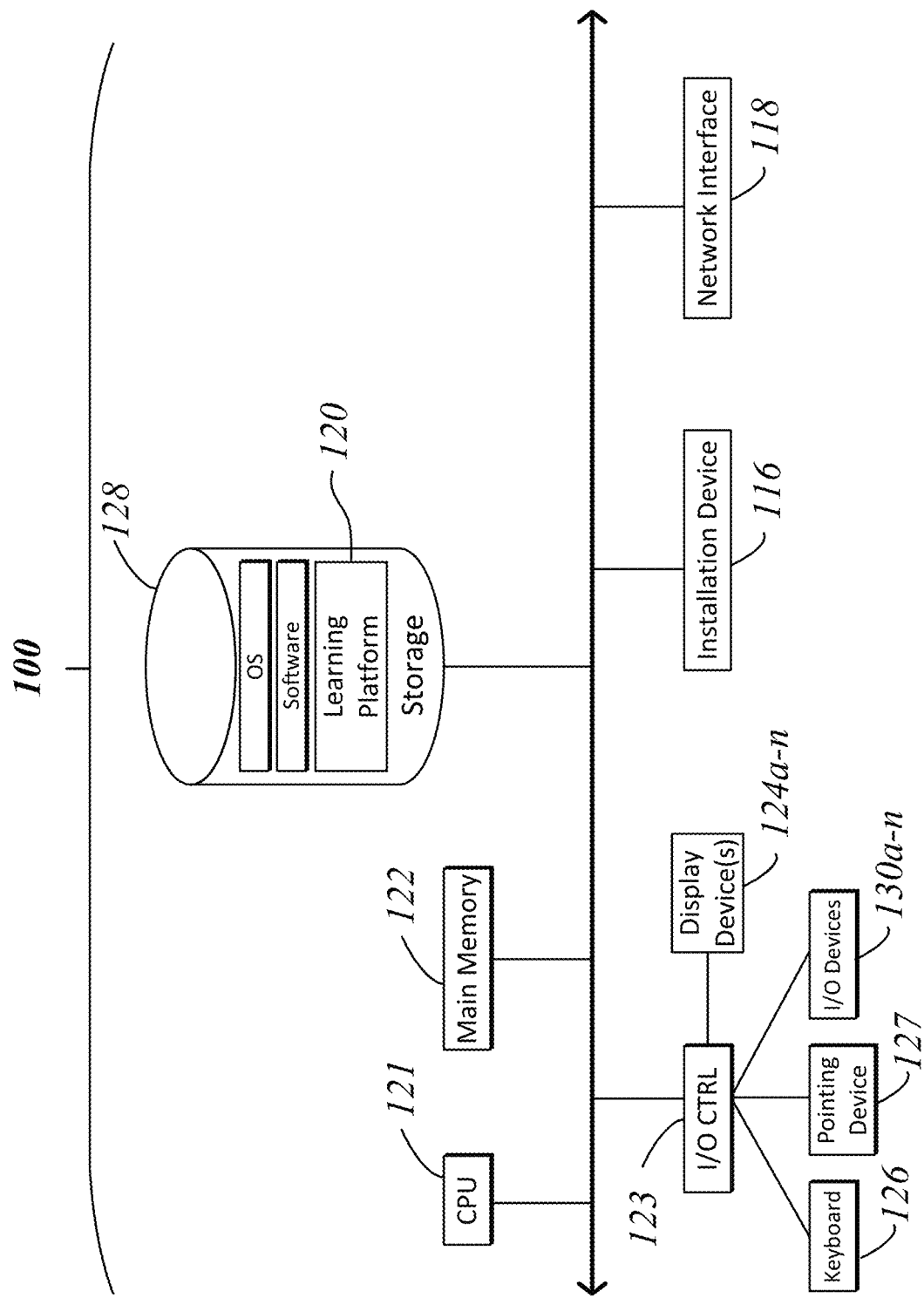
FIGS. 1C and 1D are block diagrams depicting embodiments of computing devices useful in connection with the methods and systems described herein.
Figure 1D:
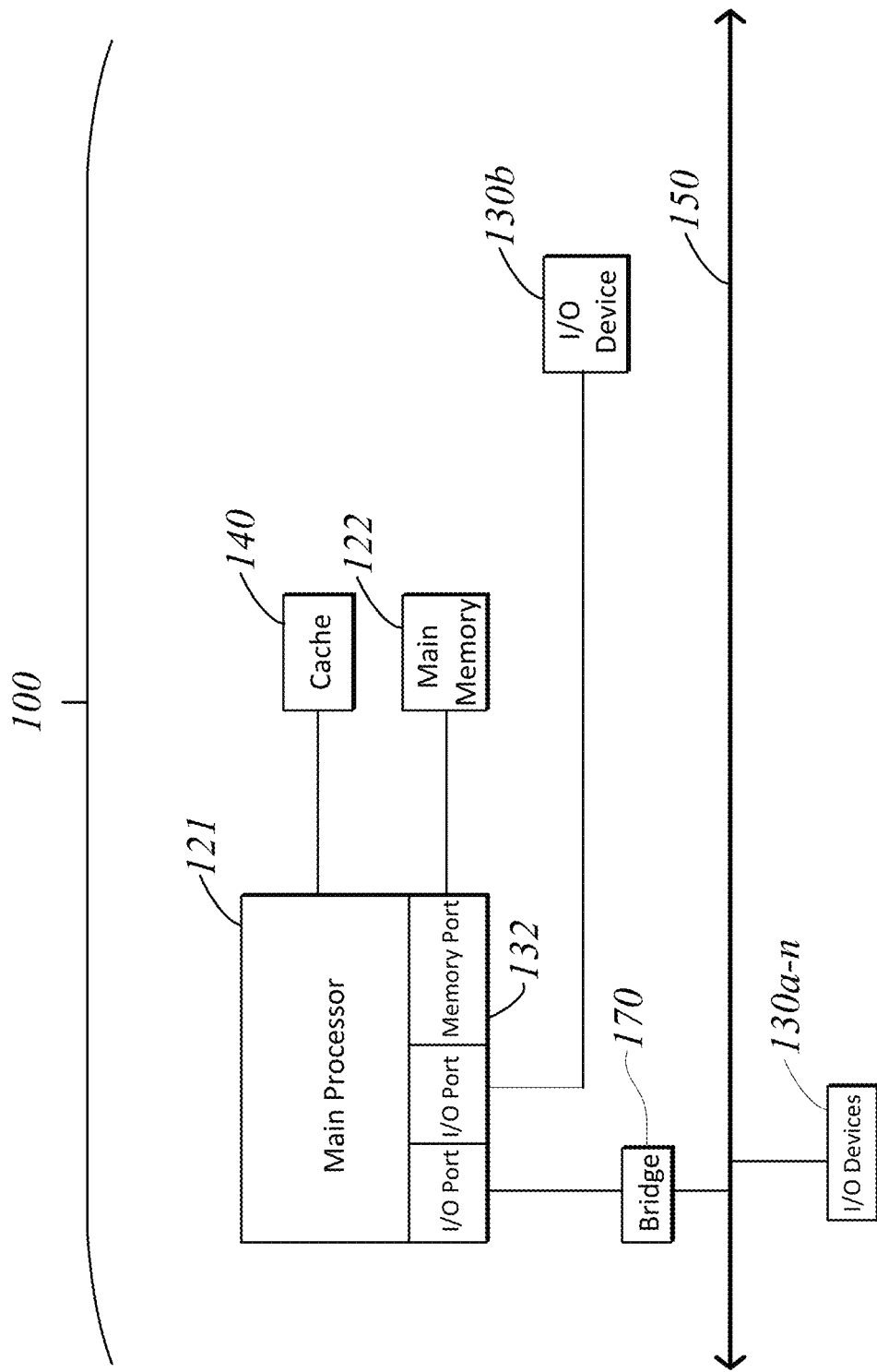

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and learning platform 120, which can implement any of the features of the educational content system 205 described herein below in conjunction with FIG. 2. As shown in FIG. 1D, each computing device 100 may also include additional optional elements, e.g. a memory port 132, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provide for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopic. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the learning platform 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage devices 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or applications from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include applications developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, a PLAYSTATION 4, PLAYSTATION 5, or PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, or a NINTENDO SWITCH device manufactured by Nintendo Co., Ltd., of Kyoto, Japan, an XBOX 360, an XBOX ONE, an XBOX ONE S, XBOX ONE X, XBOX SERIES S, or an XBOX SERIES X device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Generating and Formatting Teaching Media

The systems and methods of this technical solution provide techniques for the automatic generation of educational content for a variety of different presentation contexts. Often, teaching media leverage similar resources in different contexts to provide for a more cohesive learning experience. For example, a graph, a photo, or a formula may appear in a lesson document and also appear in a question as part of a problem set. Further, as remote learning continues to increase in popularity, automatic formatting of content for different devices and display requirements becomes necessary to ensure that students and teachers can provide effective educational content in all contexts. Some example representations of content can include, for example, Word documents (e.g., in doc format, docx format, rich-text format, other word processing formats, etc.), presentations or slides, online tests or quizzes, online or electronic textbooks, and digital flashcards, among others.

Conventionally, educators are required to manually format teaching content for each presentation context. Said another way, an educator must manually prepare and format flashcards, presentation slides, and electronic textbook pages using conventional formatting tools. However, such manual formatting tools, and manual formatting approaches in general, often produce inconsistent and time consuming results. Further, if an educator makes a change to a content asset, the educator must then manually update and re-format each of the information resources that include that asset, introducing additional opportunities for errors or other inconsistencies.

The systems and methods of this technical solution provide additional formatting tools that can automatically generate and format information resources from media content provided by educators. The systems and methods can apply logic to granularly stored questions, explanatory content, images, videos, and other media content, that enables the same content to be automatically formatted and converted into multiple media, such as presentation slides, text-based questions, Word documents, and flashcards, among others. The systems and methods of this technical solution can automatically produce consistent content based on media assets and initial formatting criteria, thereby reducing materials creation to mere selection and removing the tedium of activities like re-sizing pictures, weighting fonts, optimizing page breaks or generating personalized cover sheets for teaching content.

The systems and methods of this technical solution present improvements in media generation and formatting systems. For example, compared to other implementations that rely on templates and storage of rich data, the systems and methods of this technical solution can separate the data to be rendered (e.g., the media content, etc.) from the styles and formatting that are to be applied to it for different contexts. The formatting information can be stored, for example, in many different levels or locations, as described herein below. The presence of additional levels of formatting rules can "overwrite," or supplant, the formatting rules of a lower priority or level.

For example, consider an image provided by an educator for inclusion into an information resource, which is to be formatted into a variety of content formats such as online questions, slides, or flashcards. As described in greater detail below, content can include a number of specific parameters that can be altered to suit a particular context. In this example, consider the "horizontal width" attribute of the image as one attribute that can be modified by the techniques herein to suit different presentation contexts. Some example sources of the horizontal width attribute of the image can include an original width of the uploaded image, a horizontal width setting provided by the educator for that image, a horizontal width setting provided by the educator for the image in a particular context, such as a print context, a presentation (e.g., slides, etc.) context, or an online practice question context, among others, or a horizontal width value that is set dynamically by the system.

Further, the systems and methods of this technical solution can solve a two-dimensional placement problem, which can operate with the following constraints: a minimum size of an image or graphic, a number of images or graphics in the content and their relationship to one another, the independent units or formulas that need to be rendered, and interface preferences, such as display resolution, display area, or device capability, among others. Using the dynamic alignment techniques described herein, the systems and methods of this technical solution can format and position multiple different types and items of media content in a single information resource, such as a page of an electronic textbook, or an online question for a quiz or an exam, as well as the other information resource formats described herein (e.g., slides, Word documents, flashcards, etc.). Thus, the systems and methods of this technical solution provide improvements to educational content generation systems by automatically applying optimal formatting to any educational materials for a specific teaching medium or context, generating multiple teaching media from a single piece of content concurrently and automatically, and reducing the amount of data entry and formatting work required to generate the teaching media.

Figure 2:
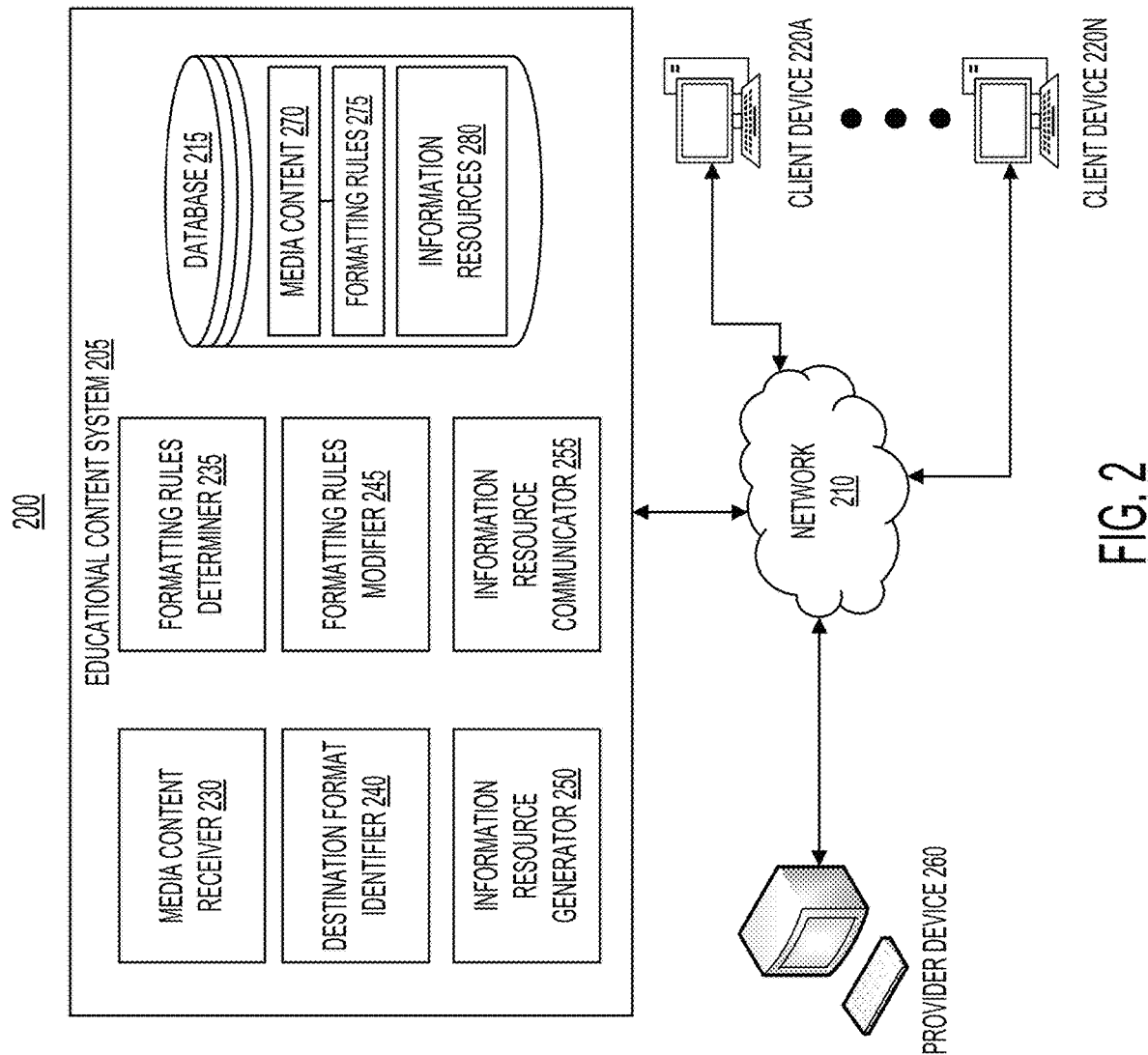
FIG. 2 is a block diagram of an example system for generating and formatting teaching media in multiple formats for different contexts, in accordance with one or more implementations.

Referring now to FIG. 2, illustrated is a block diagram of an example system 200 for generating and formatting teaching media in multiple formats for different contexts, in accordance with one or more implementations. The system 200 can include at least one educational content system 205, at least one network 210, one or more client devices 220A-220N (sometimes generally referred to as client device(s) 220), and at least one provider device 260. The educational content system 205 can include at least one media content receiver 230, at least formatting rules determiner 235, at least one destination format identifier 240, at least one formatting rules modifier 245, at least one information resource generator 250, at least one information resource communicator 255, and at least one database 215. The database 215 can include media content 270, formatting rules 275, and information resources 280. In some implementations, the database 215 can be external to the educational content system 205, for example, as a part of a cloud computing system or an external computing device in communication with the devices (e.g., the educational content system 205, the client devices 220, the provider device 260, etc.) of the system 200 via the network 210.

Each of the components (e.g., the educational content system 205, the network 210, the client devices 220, the provider device 260, the media content receiver 230, at least formatting rules determiner 235, the destination format identifier 240, the formatting rules modifier 245, the information resource generator 250, the information resource communicator 255, the database 215, etc.) of the system 200 can be implemented using the hardware components or a combination of software with the hardware components of a computing system, such as the computing system 100 detailed herein in conjunction with FIGS. 1A-1D, or any other computing system described herein. Each of the components of the educational content system 205 can perform any of the functionalities detailed herein.

The educational content system 205 can include at least one processor and a memory, e.g., a processing circuit. The memory can store processor-executable instructions that, when executed by the processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The educational content system 205 can include one or more computing devices or servers that can perform various functions as described herein. The educational content system 205 can include any or all of the components and perform any or all of the functions of the computer system 100 described herein in conjunction with FIGS. 1A-1D.

The network 210 can include computer networks such as the Internet, local, wide, metro or other area networks, intranets, satellite networks, other computer networks such as voice or data mobile phone communication networks, and combinations thereof. The educational content system 205 of the system 200 can communicate via the network 210, for example, with one or more client devices 220 or with the provider device 260. The network 210 may be any form of computer network that can relay information between the educational content system 205, the one or more client devices 220, and one or more information sources, such as web servers or external databases, amongst others. In some implementations, the network 210 may include the Internet and/or other types of data networks, such as a local area network (LAN), a wide area network (WAN), a cellular network, a satellite network, or other types of data networks. The network 210 may also include any number of computing devices (e.g., computers, servers, routers, network switches, etc.) that are configured to receive and/or transmit data within the network 210. The network 210 may further include any number of hardwired and/or wireless connections. Any or all of the computing devices described herein (e.g., the educational content system 205, the one or more client devices 220, the provider device 260, the computer system 100, etc.) may communicate wirelessly (e.g., via WiFi, cellular, radio, etc.) with a transceiver that is hardwired (e.g., via a fiber optic cable, a CAT5 cable, etc.) to other computing devices in the network 210. Any or all of the computing devices described herein (e.g., the educational content system 205, the one or more client devices 220, the provider device 260, the computer system 100, etc.) may also communicate wirelessly with the computing devices of the network 210 via a proxy device (e.g., a router, network switch, or gateway). In some implementations, the network 210 can be similar to or can include the network 104 or the cloud 108 described herein above in conjunction with FIGS. 1A and 1B.

Each of the client devices 220 can include at least one processor and a memory, e.g., a processing circuit. The memory can store processor-executable instructions that, when executed by the processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The client devices 220 can include one or more computing devices or servers that can perform various functions as described herein. The one or more client devices 220 can include any or all of the components and perform any or all of the functions of the computer system 100 described herein in conjunction with FIGS. 1A-1D. The client devices 220 can be, or can be similar to, the client devices 102 described herein above in conjunction with FIGS. 1A-1D.

Each client device 220 can include, but is not limited to, a television device, a mobile device, smart phone, personal computer, a laptop, a gaming device, a kiosk, or any other type of computing device. Each client device 220 can be implemented using hardware or a combination of software and hardware. Each client device 220 can include a display device that can provide visual information, such as information presented as a result of executing instructions stored in the memory of the client device 220. The display device can include an liquid-crystal display (LCD) device, an organic light-emitting diode (OLED) display, a light-emitting diode (LED) display, a bi-stable display (e.g., e-ink, etc.), amongst others. The display device can present one or more user interfaces on various regions of the display in accordance with the implementations described herein. In some implementations, the display device can include interactive elements, such as capacitive or resistive touch sensors. Thus, the display device can be an interactive display (e.g., a touchscreen, a display, etc.), and can include one or more input/output (I/O) devices or interfaces. Each client device 220 can further include or be in communication with (e.g., via a communications bus coupled to the processors of the client devices 220, etc.) one or more input devices, such as a mouse, a keyboard, or digital keypad, among others. The display can be used to present one or more applications as described herein, such as web browsers or native applications. The display can include a border region (e.g., side border, top border, bottom border). The inputs received via the input/output devices (e.g., touchscreen, mouse, keyboard, etc.) can be detected by one or more event listeners, and indicate interactions with one or more user interface elements presented on the display device of the client devices 220. The interactions can result in interaction data, which can be stored and transmitted by the processing circuitry of the client device 220 to other computing devices, such as those in communication with the client devices 220. The interaction data can include, for example, interaction coordinates, an interaction type (e.g., click, swipe, scroll, tap, etc.), and an indication of an actionable object with which the interaction occurred. Thus, each client device 220 can enable a user to interact with and/or select one or more actionable objects presented as part of graphical user interfaces to carry out various functionalities as described herein.

The client devices 220 can each execute one or more client applications, which can be a web browser or native application that presents educational content provided by the educational content system 205. The one or more client applications can cause the display device of one or more client devices 220 to present a user interface that includes educational content, such as presentation slides, word documents, online questions, or electronic textbooks, among others. The application can be a web application (e.g., provided by the educational content system 205 via the network 210, etc.), a native application, an operating system resource, or some other form of executable instructions. In some implementations, the client application can include a local application (e.g., local to a client device 220), hosted application, Software as a Service (SaaS) application, virtual application, mobile application, and other forms of content. In some implementations, the application can include or correspond to applications provided by remote servers or third party servers. In some implementations, the application can access the information resources 280 maintained by the database 215, and generate a user interface that displays one or more of the information resources 280 on the display device of the client device 220 on which the client application is executing. In some implementations, the user interface can include one or more actionable objects that correspond to multiple choice question answers presented as part of the information resource 280. In some implementations, the actionable object can be a "fill-in-the-blank" box that can accept user input, and transmit the input to the educational content system 205 for storage or further processing. Such actionable objects can include user-selectable hyperlinks, buttons, graphics, videos, images, or other application features that generate a signal that is processed by the application executing on the respective client device 220.

In embodiments, one or more client devices 220 can establish one or more communication sessions with the educational content system 205. The one or more communication systems can each include an application session (e.g., virtual application), an execution session, a desktop session, a hosted desktop session, a terminal services session, a browser session, a remote desktop session, a URL session and/or a remote application session. Each communication session can include encrypted and/or secure sessions, which can include an encrypted file, encrypted data or traffic.

Each of the client devices 220 can be computing devices configured to communicate via the network 210 to access the information resources 280, such as web pages via a web browser, or application resources via a native application executing on a client device 220. When accessing the information resources 280, the client device 220 can execute instructions (e.g., embedded in the native applications, or a script in the information resources 280, etc.) that cause the client devices to display educational content, which can include images, video, audio, quiz or exam questions, practice questions, or other types of educational content. As described herein, the client device 220 can transmit one or more requests for educational content to the educational content system 205, and can receive one or more responses that include the requested content. An educational content request can include, for example, a request for a lesson, a request for a question, a request for an information resource related to a topic, or a request for information specified in a query, among others.

In response to interactions with the various user interface elements, the client devices 220 can transmit information, such as account information (e.g., changing account parameters, changing login information, etc.), interaction information, selections of question answers, provided answers to questions, selections of topics, categories, or lesson-based information, or other signals to the educational content system 205. Generally, the client devices 220 can request and display educational content received from the educational content system 205. The requests can include, for example, requests to access information from an educational lesson provided by the provider device 260, or information related to one or more queries provided by the client devices 220. The request can be a hypertext transfer protocol (HTTP or HTTPS) request message, a file transfer protocol message, an email message, a text message, or any other type of message that can be transmitted via the network 210.

The provider device 260 can include at least one processor and a memory, e.g., a processing circuit. The memory can store processor-executable instructions that, when executed by the processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The provider device 260 can include one or more computing devices or servers that can perform various functions as described herein. The provider device 260 can include any or all of the components and perform any or all of the functions of the computer system 100 described herein in conjunction with FIGS. 1A-1D. The client devices 220 can be, or can be similar to, the client devices 102 described herein above in conjunction with FIGS. 1A-1D.

The provider device 260 can be substantially similar to one or more of the client devices 220 described herein above, and can include any of the hardware components of the client devices 220, as well as perform any of the functionalities of the client devices 220 as described herein. In addition, the provider device 260 can communicate with the educational content system 205 to provide media content 270, which can be formatted into one or more information resources 280 as described herein. The provider device 260 can be operated by one or more educators or educational content creators, and can provide the media content 270 to the educational content system 205 via the network 210 in one or more formatting requests. The formatting requests can be requests to generate formatted content using the media content 270 included in the formatting requests. In some implementations, a formatting request can include one or more initial formatting rules, which can be, or can be similar to, the formatting rules 275 described herein.

In some implementations, the provider device 260 can execute one or more applications, such as a web browser, that presents a user interface that allows a user to transmit media content 270 to the educational content system 205 in a formatting request. In some implementations, the formatting request can specify one or more information resources to generate using the media content 270. In some implementations, the formatting request can include a selection of media content 270 already maintained by the educational content system 205 to use in generating specified information resources 280. For example, the formatting request can specify one or more items of media content 270, one or more formatting rules (e.g., an order of presentation of images, a size of one or more images, a font size, a font type-face, etc.), and can specify one or more destination formats (e.g., types of information resources). In some implementations, the formatting request can be a request to modify one or more formatting rules of existing information resources.

The user interfaces presented on the display device of the provider device 260 can provide a user with access to each of the information resources 280, the media content 270, and the formatting rules 275. In some implementations, the provider device 260 can access only the information resources 280, the media content 270, and the formatting rules 275, which the provider device 260 is authorized to access. For example, the provider device 260 can access the functionality of the educational content system 205 by first entering login credentials or other identification information that identifies an account of the provider device 260 that is maintained by the educational content system 205. The account can be associated with certain media content 270, formatting rules 275, and information resources 280, and which can then be accessed by the provider device 260 in response to the authentication credentials.

The database 215 can be a computer-readable memory that can store or maintain any of the information described herein. The database 215 can maintain one or more data structures, which may contain, index, or otherwise store each of the values, pluralities, sets, variables, vectors, numbers, or thresholds described herein. The database 215 can be accessed using one or more memory addresses, index values, or identifiers of any item, structure, or region maintained in the database 215. The database 215 can be accessed by the components of the educational content system 205, or any other computing device described herein, such as the client devices 220 or the provider device 260, via the network 210. In some implementations, the database 215 can be internal to the educational content system 205. In some implementations, the database 215 can exist external to the educational content system 205, and may be accessed via the network 210. The database 215 can be distributed across many different computer systems or storage elements, and may be accessed via the network 210 or a suitable computer bus interface. The educational content system 205 (or the components thereof) can store, in one or more regions of the memory of the educational content system 205, or in the database 215, the results of any or all computations, determinations, selections, identifications, generations, constructions, or calculations in one or more data structures indexed or identified with appropriate values. Any or all values stored in the database 215 may be accessed by any computing device described herein, such as the educational content system 205, to perform any of the functionalities or functions described herein. In some implementations, the database 215 can be similar to or include the storage 128 described herein above in conjunction with FIG. 1C. In some implementations, instead of being internal to the educational content system 205, the database 215 can be a distributed storage medium in a cloud computing system such as the cloud 108 detailed herein in connection with FIG. 1B.

The database 215 can store media content 270, which can be provided by the provider device 260 as described herein. In some implementations, the media content 270 can be stored in association with an identifier (e.g., an authentication credential, a username, etc.) of the user that provided the media content 270. The media content 270 can include any form of educational media, such as text, images, video, audio, or instructions to display images, video, or text in an information resource. The media content 270 can be stored in association with one or more tags, topics, or category identifiers that indicate the type of information provided by the media content 270. The media content 270 can be stored as individual content items in one or more data structures, and can be stored in association with a timestamp corresponding to the time the item of media content 270 was stored in the database 215. The media content 270 can have various presentation attributes. For example, images can include presentation attributes such as image height, image width, image format (e.g., BMP, PNG, JPEG, SVG, etc.), image bit-depth, and other image attributes. Presentation attributes for videos can include video duration, video codec, sound codec, and video resolution (e.g., width, height, etc.), closed captioning information (e.g., text content, etc.), among others. Presentation attributes for text can include font type-face, font size, text location, and other information. In some implementations, an item of media content 270 can include an identifier to a different item of media content 270. For example, an item of media content 270 can include instructions that cause the item of media content 270 to be presented on an information resource with a second item of media content. In some implementations, the presentation attributes of the item of media content 270 can specify a relative position of the item of content to the second item of media content 270 when presented on an information resource.

The database 215 can store or maintain formatting rules 275. The formatting rules 275 can be instructions stored in association with one or more items of the media content 270. The formatting rules 275 can specify one or more modifications to apply to the presentation attributes of the media content 270 for certain presentation contexts. The presentation contexts can be, for example, a type or format of an information resource on which a particular item on media content 270 will be presented. The formatting rules 275 can be stored in association with one or more levels, tiers, or priority levels. In general, formatting rules 275 that have a higher priority, or level, can override or supersede a formatting rule 275 for a presentation attribute of an item of the media content 270. The lowest priority level of the formatting rules 275 for a presentation attribute of an item of media content 270 can be a default presentation attribute. For example, the height of an image when uploaded to the educational content system 205 can be treated as the default value for the image height, as it has not been modified by the educator or for any particular context. Other, additional formatting rules 275 can specify different priorities, or levels, for a particular item of the media content 270.

In some implementations, the priority or level can be manually specified via input to the provider device 260. For example, a user of the provider device 260 can specify an image height (e.g., via user interface input) for an image (e.g., an item of the media content 270) while uploading the image to the educational content system 205. In some implementations, formatting rules 275 can be specified for certain presentation attributes of the items of media content 270 for a particular context. Such formatting rules 275 can supersede, or override, default formatting rules 275 for that presentation attribute or formatting rules 275 set for that presentation attribute at upload time (e.g., applied globally across all contexts, etc.). Another type of the formatting rules 275 that supersedes any of the preceding formatting rules 275 for a particular presentation attribute of an item of media content 270 can be a formatting rule 275 that is dynamically determined by the educational content system 205, as described herein. Such formatting rules 275 can supersede those set manually by a user for a particular context, and can themselves specify values for presentation parameters of contexts in among certain presentation contexts. For example, the educational content system 205 (or the components thereof) may dynamically apply a formatting rule 275 for a particular presentation context but not other presentation contexts. Thus, for the particular context, the formatting rules 275 determined by the educational content system 205 would be used, and other formatting rules 275 would be used for the same media content when presented in other presentation contexts. One useful feature of the systems and methods described herein are the separation of the media content 270 and the formatting rules 275 that govern how the media content 270 is to be presented. By presenting media content 270 differently in different contexts, using the level-based formatting rules 275 described herein, the systems and methods of this technical solution provide improvements to educational content generation and presentation systems.

The database 215 can store or maintain one or more information resources 280. The information resources can be resources that present specified media content (e.g., specified by instructions in the information resources 280, etc.), according to appropriate formatting rules 275. Said another way, each information resource 280 can specify one or more items of media content 270, and the educational content system 205 can determine which formatting rules 275 to apply to the specified media content 270 to display the specified media content 270 in the information resource 280. In some implementations, the information resources 280 can specify which of the formatting rules 275 to apply to the media content 270 specified in the information resource. As described herein, the information resources 280 can include, web pages, online quizzes, online exams, practice textbooks, native application pages, word processing documents, packaged document format (PDF) documents, presentation slides, flashcards, or any other type of information presentation medium described herein. The information resources 280 can be accessed by one or more provider devices 260, or the client devices 220. The provider device 260 can access and modify the information resources 280, the media content 270, and the formatting rules 275 via a user interface presented on the provider device 260. Each of the components of the educational content system 205 can access, update, or modify the media content 270, the formatting rules 275, or the information resources 280, to carry out functionalities detailed herein.

In some implementations, an information resource 280 can be, or can include, one or more presentation slides. The presentation slides themselves can include any type of media content 270, such as questions, notes, explanatory content, text, images, video, audio, or any other type of media content 270. In some implementations, presentation slides can include media content 270 that is displayed across multiple displays. For example, a portion of the information resource 280 designated to be displayed on a presentation display can present primary media content 270, such as questions, answer options, sub-questions, hints, or other teaching content. In addition, secondary media content 270 of the information resource 280 can be displayed on a display of the presenter (e.g., a teacher or educational content provider). The secondary media content 270 can be similar to the primary media content 270 while including additional teaching information, such as explanatory text, presentation notes, correct question answers, or other secondary teaching content. The information resource 280 can include instructions, such as the formatting rules 275, that cause the display of the presenter to render one or more of the primary media content 270 or the secondary media content 270, while the presentation display (e.g., a display presented to one or more students) can include just the primary media content 270. As described herein, the educational content system 205 can generate such information resources 280, including appropriate formatting rules 275, using the techniques described herein such that the primary media content 270 of the information resource is displayed on the presentation display, and the secondary media content 270 is displayed on the display of the presenter.

Referring now to the operations of the educational content system 205, the media content receiver 230 can receive media content 270 from a provider device 260 or a client device 220. The media content 270 can include, or specify, one or more media modalities. The media modalities can be, for example, a media format such as an image, a video, audio content, text-based content, or any combination thereof. For example, the media content 270 can be a practice question that includes one or more images, text content (e.g., LaTeX formulas and surrounding text, etc.), and one or more question answers (e.g., multiple choice options, fill-in-the-blank, etc.). Each of the modalities in the media content can include one or more presentation attributes. The presentation attributes can correspond to an aspect of how individual content modalities of the media content 270 are to be presented on a presentation resource, such as the information resources 280.

For example, a presentation attribute for an image can be an image size, an image position, image colors (e.g., color depth, bit depth, grayscale, etc.), image interactive features (e.g., zoom, pan, etc.), or other presentation features. Presentation attributes for text can include font size, font typeface, font colors, character spacing, or other presentation features of text based content. Presentation attributes of video can include video duration, video closed captioning information (e.g., text information for closed captions, timing information for closed captions, language information, etc.), language information, video codec information, audio codec information, video size (e.g., width, height, etc.), video position, video colors (e.g., color depth, bit depth, grayscale, etc.), image interactive features (e.g., zoom, pan, mute, full-screen, increase or decrease volume, etc.), among others. As described herein, in some implementations, the media content receiver 230 can receive media content 270 as part of a request to format media content into one or more information resources, which can be presented in different presentation contexts.

In some implementations, the media content 270 received from the provider device 260 or the client device 220 can specify preliminary layout information. As described herein above, the media content 270 received from the provider device 260 or the client device 220 can include multiple media modalities (e.g., one or more images, text, videos, audio, etc.). Each of these items can make up the media content 270, and can include preliminary layout information. For example, if the media content 270 is a practice question that includes an image and text information, the media content 270 can further specify how the image should be presented relative to the text information. Furthering this example, the media content 270 can include preliminary formatting information that specifies the relative position of the image to the text information. Likewise, certain text information (e.g., LaTeX formulas, etc.) can specify preliminary positioning or formatting requirements (e.g., to be placed at top of the question, all to be placed on one line, etc.). Upon receiving the media content 270 from the provider device 260 or the client device 220, the media content receiver 230 can store the media content 270 in one or more data structures in the memory of the educational content system 205 or in the database 215.

The formatting rules determiner 235 can determine initial formatting rules 275 for the media content 270. The formatting rules determiner 235 can determine the initial formatting rules 275 based on the presentation attributes of each of the media modalities present in the media content 270. In some implementations, the formatting rules determiner 235 can determine the initial formatting rules 275 in response to receiving the media content 270 from the provider device 260 or from the client device 220. To determine the initial formatting rules 275 for the media content 270, the formatting rules determiner 235 can identify each of the media content 270 that corresponds to each of the media modalities present in the media content. For example, if the media content 270 provided to the educational content system 205 is a practice question that includes text data, image data, and video data, the formatting rules determiner 235 can identify (e.g., parse, extract, etc.) each presentation attribute of each of the text data, image data, and video data in the practice question. The formatting rules determiner 235 can determine initial formatting rules 275 of the media content 270 as the default values of each of the presentation attributes of each media type (e.g., modality, etc.) present in the media content. For example, if the media content 270 includes an image, the formatting rules determiner 235 can determine the presentation attributes of the image (e.g., image height, image width, image color, image position relative to other media content 270, etc.) as the default formatting rules 275.

In some implementations, the formatting rules determiner 235 can determine the initial formatting rules 275 as including formatting rules specified by a user from the provider device 260 or the client device 220. For example, as described herein above, the provider device 260 or the client device 220 can provide media content 270 to the educational content system 205, and can specify certain formatting requirements for the content. The formatting rules determiner 235 can store the default formatting rules 275 (as above), at the lowest priority (or level), and can store the user-specified formatting rules 275 as part of the initial formatting rules 275 at a higher level than the default formatting rules 275. In some implementations, the provider device 260 or the client device 220 can select a priority (or a level) for one or more of the formatting rules 275 of the presentation attributes of the media content. In some implementations, the provider device 260 or the client device 220 can provide additional formatting rules 275 for the media content 270 that apply to the media content 270 when the media content 270 is presented in different contexts (e.g., in different types of information resources, etc.). In such implementations, the formatting rules determiner 235 can store the additional formatting rules 275 for the presentation attributes of the media content in association with an identifier of specified context to which the additional formatting rules pertain. The additional formatting rules 275 can be stored as part of the initial formatting rules for the media content at a higher priority (or level) than the other presentation attributes for the specified context.

Although the above description of determining initial formatting rules 275 for the media content 270 can apply to a single item of content (e.g., a single image, text segment, audio file, video, etc.), it should be understood that the formatting rules determiner 235 can determine initial formatting rules 275 for each presentation attribute of each item of content provided as part of the media content 270. Each item of content (e.g., each having a media modality, etc.) in the media content provided by the provider device 260 or the client device 220 can be referred to as a portion of the media content 270. Thus, the formatting rules determiner 235 can determine initial formatting rules 275 corresponding to each presentation attribute of each portion of the media content 270 provided by the provider device 260 or the client device 220. In some implementations, the formatting rules determiner 235 can determine the initial formatting rules preliminary layout information provided by the provider device 260 or the client device 220, in connection with the media content 270. For example, the formatting rules determiner 235 can determine the initial formatting rules 275 for each presentation attribute as corresponding to the preliminary layout information indicated in the above. The preliminary layout information can indicate, for example, the relative size of two images to one another, the relative position of two images to one another when presented as part of an information resource 280, among any other layout information described herein.

The destination format identifier 240 can identify a destination format for the media content 270. The destination format can include at least one formatting requirement. A formatting requirement can correspond to a requirement for different types of content (e.g., different content modalities, etc.). In some implementations, the destination format identifier 240 can identify the destination format by transmitting one or more queries to the computing device that provided the media content 270 (e.g., the provider device 260, the client device 220, etc.). The queries can include one or more potential destination formats, which can be presented in one or more user interfaces on a display of the provider device 260. The user interfaces can have actionable objects that allow a user to select one or more of the destination formats. The destination formats can correspond to a type of information resource that the media content 270 can be formatted into using the formatting rules 275. The destination formats can include, for example, word documents, presentation slides, flash cards, electronic textbook pages, webpages, native application resources, online quiz questions, online practice questions, or online exam questions, among others. Upon selecting one or more of the potential destination formats, the provider device 260 or the client device 220 can transmit a message that indicates each of the selected potential destination formats to the educational content system 205. The destination format identifier 240 can receive the message and parse the selection of the one or more selected destination formats. In some implementations, the message can specify (e.g., via user selection) certain portions of the media content 270 as primary media content 270 for a presentation display or secondary media content 270 for a presenter display.

In some implementations, the destination format identifier 240 can determine a destination format based on a device type of a client device 220 that requests media content 270 from the educational content system 205. For example, one or more of the client devices 220 can transmit a request to the educational content system 205 that requests a specific item of the media content 270, such as a practice question. The request can include the type of device that is requesting the media content 270. The type of the device can include the display capabilities (e.g., display resolution, etc.) of the client device 220 and the display context (e.g., web browser, native application, etc.) where the requested media content 270 is to be displayed. Likewise, in some implementations, the destination format identifier can determine one or more portions of the media content 270 to designate as primary media content 270 for display on a presentation display, and other portions of the media content 270 to designate as secondary media content 270 for a presenter display.

The formatting rules modifier 245 can modify the initial formatting rules 275 for the media content based on the formatting requirement of the one or more destination formats identified by the destination format identifier 240. The formatting rules modifier 245 can generate modified formatting rules 275. As described herein above, each destination format (e.g., formats of the various types of information resources described herein, etc.), can have certain formatting requirements. For example, a page of an electronic textbook can have predetermined page dimensions, and can have a predetermined region for rendering media content 270. To accommodate such formatting requirements, the formatting rules modifier 245 can generate formatting rules that supersede the initial user-specified formatting rules 275 determined by the formatting rules determiner 235.

In some implementations, the formatting rules modifier 245 can modify the initial formatting rules 275 for the media content 270 based on presentation capabilities of the device type on which the media content 270 will be presented. For example, the presentation capabilities can indicate a maximum horizontal resolution and a maximum vertical resolution of content displayed on the device. To accommodate these capabilities, the formatting rules modifier 245 can modify the initial formatting rules 275 by generating an additional formatting rule for the media content 270 that has a priority value that supersedes that of the initial formatting rules 275. The additional formatting rules can modify the presentation attributes of the media content 270 (e.g., the width/height of images, the font size, character spacing of text, etc.) to fit within the constraints of the device that will be displaying the media content. The modified formatting rules 275 can be stored in association with an identifier of the device. In some implementations, the formatting rules modifier 245 can modify the formatting rules 275 for primary portions of the media content 270 and secondary portions of the media content 270. For example, the formatting rules modifier 245 can generate formatting rules 275 that cause primary media content 270 to be displayed on a first display, such as a presentation display, and secondary media content 270 to be displayed on a secondary display, such as a display of a presenter. As such, the formatting rules modifier 245 can generate formatting rules for media content by modifying the initial formatting rules to cause portions of the media content 270 to only be visible on certain displays in a multi-display environment. Examples of multi-display environments include a presentation environment, which can include a presentation display shown to students and a presenter display visible only to an educator. Similar environments can include laptops with auxiliary screens, or displaying content across one or more devices such as a personal computer and a smartphone, among others.

In some implementations, the formatting rules modifier 245 can modify the initial formatting rules 275 for the media content 270 based on minimum and maximum values of the presentation attributes (e.g., of a range of possible values of the presentation attributes, etc.) for the media modalities (e.g. each portion of media content, etc.) present in the media content 270. The minimum and maximum values for a particular modality can be a predetermined range of practical values for the presentation attributes of the portions of media content 270. These values can be stored in association with an identifier of the particular modality. For example, a minimum font size can be a 6-point font, because font sizes smaller than 6-point font are practically unreadable. Likewise, a maximum font size can be 72-point font, because larger fonts would otherwise obscure other portions of the media content. It should be understood that different ranges for a presentation attribute of the media content 270 can be established for different presentation contexts (e.g., different types of information resources, etc.). Although the above example describes the maximum and minimum values for font size, it should understood that minimum and maximum values can be determined for any type of presentation attribute of any media content 270 type (e.g., any media modality such as videos, images, audio, etc.) as described herein.

The minimum and maximum values for a presentation attribute of the media content presentation context (e.g., destination format, etc.) can be considered as part of the formatting requirements of that presentation format. However, in some implementations, the range of possible presentation for a particular type of media content 270 can be discrete, and thus have a limited set of values that can be chosen for a given destination format. In such circumstances, the formatting rules modifier 245 can select one of the presentation attributes in the range defined by the minimum and the maximum values of the presentation attributes based on the formatting requirements of the destination format. For example, if the destination format is a web page that will be displayed on a mobile device, the formatting rules modifier 275 can modify the initial formatting rules 275 by adding an additional formatting rule with a higher priority for that destination format (e.g., presentation context, etc.). The additional formatting rule can specify that the presentation attribute should be modified to the selected value within the range defined by the minimum and maximum values of the presentation attribute when the particular media content 270 is displayed in the destination format. The formatting rules modifier 245 can perform such operations for one or more of the media modalities (e.g., content types, etc.) present in the media content 270.

In another example, the formatting rules modifier 245 can modify the initial formatting rules 275 for images, such that the presentation attributes (e.g., image width, image height, etc.) of one or more images in the media content 270. For example, the formatting rules modifier 245 can modify the initial formatting rules 275 for the media content 270 by determining an adjusted size for the one or more images in the media content 270. To do so, the formatting rules modifier 245 can access the formatting requirements for the destination format, and identify at least one of a maximum possible height for the image or a maximum possible width for the image. For example, if the preliminary layout information specified when the media content 270 was provided to the educational content system 205 indicates that an image can occupy the maximum width of the destination format (e.g., occupy the width of a page of a textbook, a powerpoint slide, etc.), the formatting rules modifier 245 can modify the formatting rules 275 by adding an additional formatting rule (with a greater priority than the other formatting rules for that destination format) that specifies the width of the image to be equal to the maximum possible width for that destination format. To properly communicate the information in the image, the formatting rules modifier 245 can also perform similar operations (e.g., adding an additional formatting rule as described herein, etc.) to also modify the height of the image to maintain the aspect ratio of the image. The formatting rules modifier 245 can determine the aspect ratio of the image by accessing the original dimensions of the image, as indicated in the media content 270 stored in the database 215.

In some implementations, the formatting rules modifier 245 can utilize a machine learning model to modify the initial formatting rules 275 for the media content 270. The machine learning model can be, for example, a linear regression model, a logistic regression model, a ridge regression model, a lasso regression model, a polynomial regression model, a Bayesian regression model, or any other type of machine learning model (e.g., a neural network, a recurrent neural network, a sparse vector machine (SVM) model, a decision tree model, a random forest model, etc.). The formatting rules modifier 245 can take, as input to the machine learning model, the default presentation attributes of the media content (e.g., font size, image width, image height, etc.), as well as any initial formatting rules 275 (e.g., any specified by the user at upload time, etc.), and any formatting requirements or constraints of the destination format, such as the overall destination format width and height. In some implementations, the machine learning model can be trained to optimize for maximum values of engagement (e.g., user interaction or user viewing time, etc.), retention (e.g., number of questions correctly answered across many devices, etc.), and monetization. The machine learning model can be trained using machine learning techniques, including supervised learning, unsupervised learning, semi-supervised learning, or combinations thereof. Thus, the formatting rules modifier 245 can modify the formatting rules 275 using machine learning models, as described herein. An example depiction of the data flow of the formatting rules modifier 245 using the machine learning model model to modify the formatting rules is described herein below in conjunction with FIG. 3.

In some implementations, the machine learning model can be trained to optimize the layout of the content by modifying the formatting rules 275 based on historic user interactions. For example, the formatting rules modifier 245 may receive user input (e.g., interactions) with interactive elements of the media content 270, and use the user inputs to track a total number of interactions that result in a desired outcome (e.g., a navigation to a particular web page, a navigation to a particular domain, a particular subsequent interaction, answering a subsequent question correctly, a purchase, etc.). The interaction information can include layout information for the user interface element with which the user interacted, such as position, size, or style (e.g., fonts, graphics, etc.), and identifiers of adjacent items of media content 270, among others. The formatting rules modifier 245 can train the machine learning model by providing properties of the item of media content 270 and the desired outcome (e.g., resulting from interaction with the item of media content 270, as input to the machine learning model, and use the known historic interaction outcome data, along with the historic interaction information for the media content 270, as ground truth data to train the machine learning model. The formatting rules modifier 245 therefore uses historic interaction data as training data for the machine learning model to optimize placement, size, and style, among other attributes and formatting rules 275, for a desired interaction outcome (e.g., engagement, monetization, retention, etc.).

Figure 3:
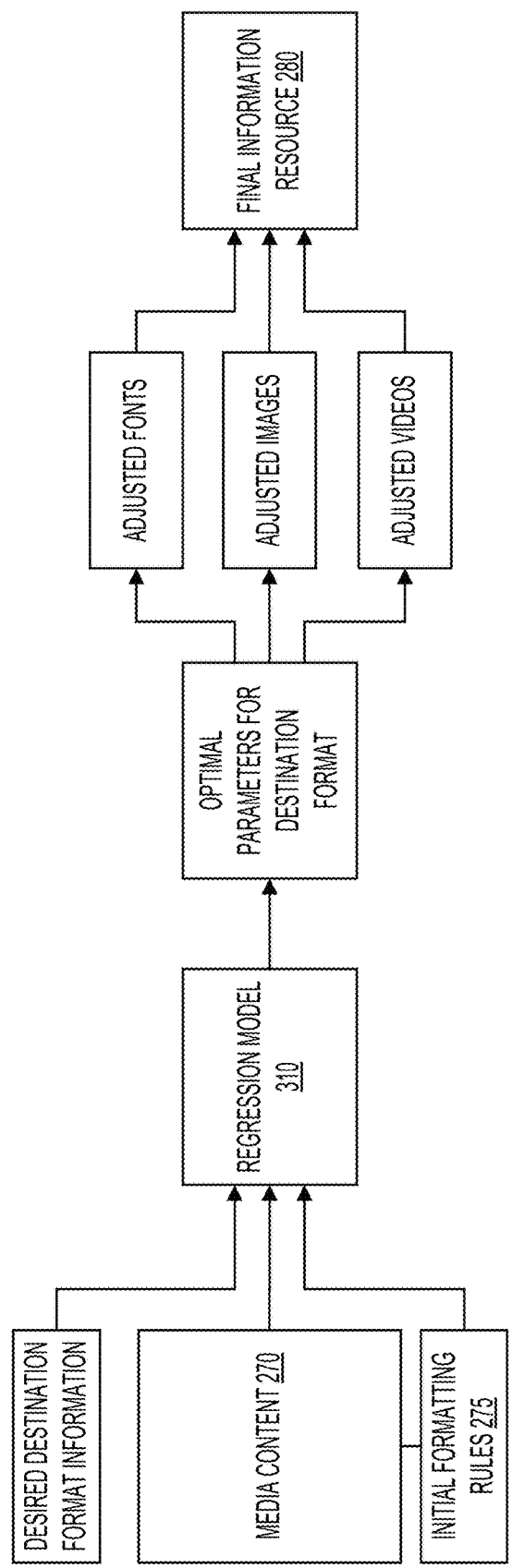
FIG. 3 illustrates a data flow diagram of formatting rules being generated using a regression model, in accordance with one or more implementations.

Referring briefly now to FIG. 3, illustrated is a data flow diagram 300 of formatting rules being generated using a regression model 310. As shown, the regression model 310 can take, as input, the parameters of the media content 270, any initial formatting rules 275 provided in conjunction with the media content 270 (e.g., preliminary layout information, sizing information, etc.), and information about the destination format (e.g., sizing constraints, color constraints, etc.). The information about the destination format can specify an area in which the media content 270 can be displayed. For example, if certain preliminary layout information, or other formatting rules 275, specify that certain content (e.g., other media content 270, etc.) has already been placed on the destination information resource, then the information about the destination formation can specify constraints (e.g., possible open areas to place media content 270, etc.) for the destination format. The regression model 310 can be trained on example data sets having known values for the optimal layout and presentation attributes for each item of media content 270 in the training data. The regression model 310 can provide, as output, the maximum size of the presentation attributes of the media content 270 such that it fits within the constraints of the destination format. The formatting rules modifier 245 can store the output value (e.g., the maximum size of the presentation attributes, etc.) in association with the media content 270, and in association with an identifier of the destination format. The formatting rules modifier 245 can use the maximum size of the media content 270 determined by the regression model to modify the initial formatting rules 275, by adding an additional formatting rule 275 that supersedes the initial formatting rules 275 for the destination format.

The modified formatting rules 275 for the destination format can specify the presentation parameters (e.g., size, relative position, etc.) of the media content 270 when the media content is rendered in the destination format. The modified formatting rules 275 can specify, for example, adjusted font sizes for text-based data, adjusted image sizes for images in the media content 270, adjusted video sizes or formats for videos in the media content. In some implementations, if the destination format is print media, the adjusted video information can be a QR code that is rendered in an image in the destination format, because videos cannot be rendered in print. The QR code can specify one or more universal resource identifiers (URIs) that identify a location of the video. A computing device can scan the QR code, and navigate to the location of the media content. Similar behavior can occur with other types of media content 270, such as three-dimensional models, interactive content (e.g., graphs, puzzles, etc.), or other online content that is otherwise unsuitable for a print medium. The adjusted values specified in the modified formatting rules 275 can be used to generate one or more of the information resources 280 described herein, which render the media content 270 according to the optimal presentation parameters provided by the regression model.

Referring back now to FIG. 2, in some implementations, the formatting rules modifier 245 can generate composite formatting rules 275, which can include formatting rules for more than one portion of media content 270. For example, if more than one item of media content can be specified on a single information resource (e.g., two practice questions on a single page of an electronic textbook, etc.), the formatting rules modifier 245 can generate formatting rules for more than one item of the media content 270. To do so, the formatting rules modifier 245 can identify second media content 270 having second initial formatting rules 275, for example, based on a request to generate an information resource 280 that includes at least two items of media content 270 received from the provider device 260 or the client device 220. Each item of media content 270 that is to be included in the information resource 270 can be associated with initial formatting rules 275 for the presentation attributes of the media content 270. Using the initial formatting rules 275 of each item of media content, the formatting rules modifier 245 can generate composite formatting rules using a regression model similar to that described herein above in connection with FIG. 3. The regression model can take, as input, the default presentation parameters of each item of media content, any initial formatting rules 275 that modify those presentation parameters, and the formatting requirements of the destination resource. The regression model can provide as output the optimal height (or other dimensions) of each item of the media content 270, such that each of the items of media content can be presented on the destination information resource 280 concurrently without losing or obscuring any information in the media content 270. Thus, the formatting rules modifier 245 can Using the optimal dimensions for each item of media content, the formatting rules modifier 245 can generate composite formatting rules for the media content 270 and the destination information resource. For example, the formatting rules modifier 275 can identify, based on the output of the regression model, a first portion of the composite formatting rules 275 corresponding to a first item of media content 270 (e.g., first optimal presentation attributes such as size, etc.), and a second portion of the composite formatting rules 275 corresponding to the second media content 270 (e.g., second optimal presentation attributes such as size, etc.). The composite formatting rules 275 can include a combination of formatting rules 275 for each item of media content 270 when the media content 270 is displayed with other items of media content 270 specified in the composite formatting rules 275. In general, the composite formatting rules 275 can specify the size and relative position of multiple items of media content 270 when the media content is presented in the destination information resource.

Once the modified formatting rules 275 have been generated for the media content 270 for each specified destination format, the information resource generator 250 can generate an information resource 280 that includes media content 270 specified by the provider device 260 or the client device 220. As described herein, the information resource 280 can be any sort of resource that displays information, such as presentation slides, word-processing documents, flash cards, online quiz questions, online exam questions, online practice questions, electronic textbook pages, or printable textbook pages, among others. The information resources 280 can be generated by parsing the formatting rules 275, which can be stored as a generic markup language that specifies different parameters of the media content 270, such as display position, display size, and other rendering information, and translate the generic markup language into an information that is suitable for an information resource. For example, Word processing documents can utilize XML markup to specify how content is displayed in word-processing documents. The information resource generator 250 can identify, or each presentation attribute of a given portion of the media content 270, each formatting rule 275 having the highest priority, and translate that formatting rule into suitable XML or other language suitable for the format of the destination information resource 280. The information resource generator 250 can perform such functionality for each item of the media content 270 until the information resource has been populated as desired.

In some implementations, the information resource generator 250 can generate the information resource 280 to include all of the media content 270 specified in composite formatting rules 275, which as described herein above, specify formatting rules 275 for multiple items of media content 270 that to appear on a single information resource. To do so, information resource generator 250 can perform similar processing steps, but apply the composite formatting rules 275 to each item of the media content 270 that is to appear on the destination information resource 280. In general, certain destination information resources 280 may include multiple display portions (e.g., multiple pages in a word document, etc.). In such circumstances, the information resource generator 250 can generate the information resource to include as many pages or portions necessary to display each item of the media content efficiently according to the composite formatting rules 275. The information resource generator 250 can repeat each of the processes identified above for each of the information resources requested by the provider device 260 or the client device 220, as described herein above. Upon generating the information resources 280, the information resource generator 250 can store each of the information resources 280 in association with the media content 270 forming a part of the information resources 280 in the database 215. In some implementations, the information resource generator 250 can generate information resources 280 that can be presented in multi-display environments, in accordance with the formatting rules 275, as described herein. For example, the information resource generator 280 can generate presentations that include primary media content 270 shown on a presentation display, and secondary media content 270 shown on a display of a presenter.

The secondary media content 270 may include any type of additional media content 270 that may be relevant to a presenter, but may not necessarily need to be shown to a presentation audience. Such information can include, for example, non-presentation notes or other materials or aspects of a question (e.g., explanations, answers, etc.). As described herein, the formatting rules modifier 245 can format this information such that the secondary media content 270 is automatically displayed on the display of the presenter, while the primary media content 270 is displayed on the presentation display. Secondary media content 270 can be formatted for any question, options, sub-parts, hints, or any other type of media content 270. In some implementations, the secondary media content 270 may be selected or formatted based on user input (e.g., from the provider device 260 when providing or formatting the media content 270, etc.). The presenter display can be a display of any type of computing device, including but not limited to auxiliary screens, laptops, smart phones, or mobile devices.

Once the information resources 280 have been generated by the information resource generator 250, the information resource communicator 255 can transmit requested information resources 280 to a requesting computing device, such as a client device 220 or the provider device 260. Each of the generated information resources 280 can correspond to an identifier, such as a URI, or other content identifier. The URI, when accessed by a computing device, can cause the information resource communicator 255 to access the information resource 280 that is identified by the URI, and transmit the appropriate information resource 280 to the requesting computing device. In some implementations, the requesting computing device must have authorization to view the requested information resource 280. In such implementations, the information resource communicator 255 can receive authentication credentials (e.g., login information, secret keys, etc.) as part of the request for the information resource 280. The information resource communicator 255 can verify the authentication credentials by comparing the authentication credentials to authentication requirements for the requested information resources 280. The authentication requirements can be specified, for example, by the provider device 260 when requesting the generation of the media content 270 into one or more destination formats (e.g., the information resources 280, etc.). The information resources 280 can thus be stored in association with the authentication requirements, which are then used to authenticate computing devices that request the information resources 280 from the educational content system 205.

Figure 4:
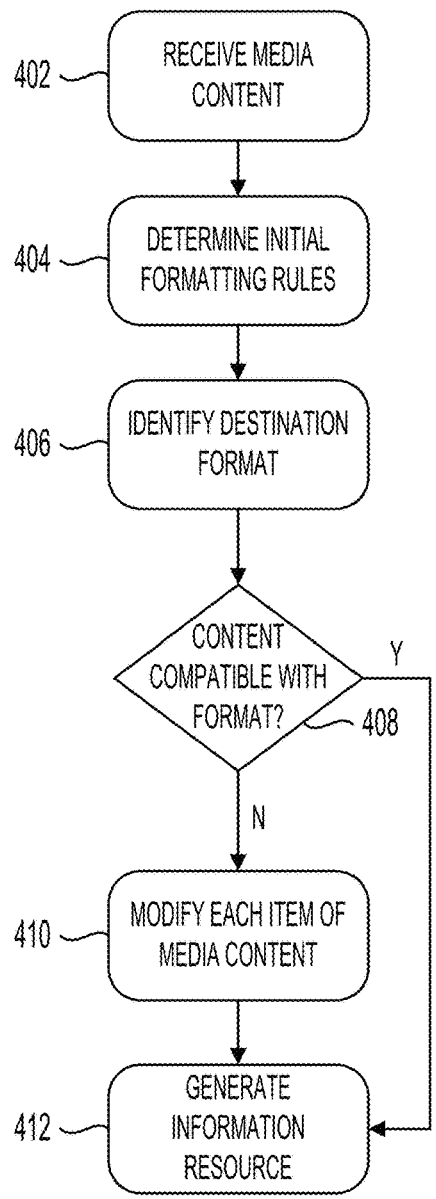
FIG. 4 illustrates an example flow diagram of a method for generating and formatting teaching media in multiple formats for different contexts, in accordance with one or more implementations.

Referring now to FIG. 4, depicted is an illustrative flow diagram of a method 400 for generating and formatting teaching media in multiple formats for different contexts. The method 400 can be executed, performed, or otherwise carried out by the educational content system 205, the computer system 100 described herein in conjunction with FIGS. 1A-1D, or any other computing devices described herein. In brief overview of the method 400, the educational content system (e.g., the educational content system 205, etc.) can receive media content (STEP 402), determine initial formatting rules (STEP 404), identify a destination formation (STEP 406), determine whether the content is compatible with a format (DECISION 408), modify each item of media content (STEP 410), and generate an information resource (STEP 412).

In further detail of the method 400, the educational content system can receive media content (STEP 402). The educational content system can receive media content (e.g., the media content 270, etc.) from a provider device (e.g. the provider device 260, etc.) or a client device (e.g., the client device 220, etc.). The media content can include, or specify, one or more media modalities. The media modalities can be, for example, a media format such as an image, a video, audio content, text-based content, or any combination thereof. For example, the media content can be a practice question that includes one or more images, text content (e.g., LaTeX formulas and surrounding text, etc.), and one or more question answers (e.g., multiple choice options, fill-in-the-blank, etc.). Each of the modalities in the media content can include one or more presentation attributes. The presentation attributes can correspond to an aspect of how individual content modalities of the media content are to be presented on a presentation resource.

For example, a presentation attribute for an image can be an image size, an image position, image colors (e.g., color depth, bit depth, grayscale, etc.), image interactive features (e.g., zoom, pan, etc.), or other presentation features. Presentation attributes for text can include font size, font typeface, font colors, character spacing, or other presentation features of text based content. Presentation attributes of video can include video duration, video closed captioning information (e.g., text information for closed captions, timing information for closed captions, language information, etc.), language information, video codec information, audio codec information, video size (e.g., width, height, etc.), video position, video colors (e.g., color depth, bit depth, grayscale, etc.), image interactive features (e.g., zoom, pan, mute, full-screen, increase or decrease volume, etc.), among others. As described herein, in some implementations, the educational content system can receive media content as part of a request to format media content into one or more information resources, which can be presented in different presentation contexts.

In some implementations, the media content received from the provider device or the client device can specify preliminary layout information. As described herein above, the media content received from the provider device or the client device can include multiple media modalities (e.g., one or more images, text, videos, audio, etc.). Each of these items can make up the media content, and can include preliminary layout information. For example, if the media content is a practice question that includes an image and text information, the media content can further specify how the image should be presented relative to the text information. Furthering this example, the media content can include preliminary formatting information that specifies the relative position of the image to the text information. Likewise, certain text information (e.g., LaTeX formulas, etc.) can specify preliminary positioning or formatting requirements (e.g., to be placed at top of the question, all to be placed on one line, etc.). Upon receiving the media content from the provider device or the client device, the educational content system can store the media content in one or more data structures in the memory of the educational content system or in a database (e.g., the database 215, etc.).

The educational content system can determine initial formatting rules (e.g. the initial formatting rules 275, etc.) for the media content (STEP 404). The educational content system can determine the initial formatting rules based on the presentation attributes of each of the media modalities present in the media content. In some implementations, the educational content system can determine the initial formatting rules in response to receiving the media content from the provider device or from the client device. To determine the initial formatting rules for the media content, the educational content system can identify each of the media content that corresponds to each of the media modalities present in the media content. For example, if the media content provided to the educational content system is a practice question that includes text data, image data, and video data, the formatting rules determine can identify (e.g., parse, extract, etc.) each presentation attribute of each of the text data, image data, and video data in the practice question. The educational content system can determine initial formatting rules of the media content as the default values of each of the presentation attributes of each media type (e.g., modality, etc.) present in the media content. For example, if the media content includes an image, the educational content system can determine the presentation attributes of the image (e.g., image height, image width, image color, image position relative to other media content, etc.) as the default (or initial) formatting rules.

In some implementations, the educational content system can determine the initial formatting rules as including formatting rules specified by a user from the provider device or the client device. For example, as described herein above, the provider device or the client device can provide media content to the educational content system, and can specify certain formatting requirements for the content. The educational content system can store the default formatting rules (as above), at the lowest priority (or level), and can store the user-specified formatting rules as part of the initial formatting rules at a higher level than the default formatting rules. In some implementations, the provider device or the client device can select a priority (or a level) for one or more of the formatting rules of the presentation attributes of the media content. In some implementations, the provider device or the client device can provide additional formatting rules for the media content that apply to the media content when the media content is presented in different contexts (e.g., in different types of information resources, etc.). In such implementations, the educational content system can store the additional formatting rules for the presentation attributes of the media content in association with an identifier of specified context to which the additional formatting rules pertain. The additional formatting rules can be stored as part of the initial formatting rules for the media content at a higher priority (or level) than the other presentation attributes for the specified context.

Although the above description of determining initial formatting rules for the media content can apply to a single item of content (e.g., a single image, text segment, audio file, video, etc.), it should be understood that the educational content system can determine initial formatting rules for each presentation attribute of each item of content provided as part of the media content. Each item of content (e.g., each having a media modality, etc.) in the media content provided by the provider device or the client device can be referred to as a portion of the media content 270. Thus, the educational content system can determine initial formatting rules corresponding to each presentation attribute of each portion of the media content provided by the provider device or the client device. In some implementations, the educational content system can determine the initial formatting rules based on preliminary layout information provided by the provider device or the client device, in connection with the media content. For example, the educational content system can determine the initial formatting rules for each presentation attribute as corresponding to the preliminary layout information indicated in the above. The preliminary layout information can indicate, for example, the relative size of two images to one another, the relative position of two images to one another when presented as part of an information resource, among any other layout information described herein.

The educational content system can identify a destination format for the media content (STEP 406). The destination format can include at least one formatting requirement. A formatting requirement can correspond to a requirement for different types of content (e.g., different content modalities, etc.). In some implementations, the educational content system can identify the destination format by transmitting one or more queries to the computing device that provided the media content (e.g., the provider device, the client device, etc.). The queries can include one or more potential destination formats, which can be presented in one or more user interfaces on a display of the provider device. The user interfaces can have actionable objects that allow a user to select one or more of the destination formats. The destination formats can correspond to a type of information resource that the media content can be formatted into using the formatting rules. The destination formats can include, for example, word documents, presentation slides, flash cards, electronic textbook pages, webpages, native application resources, online quiz questions, online practice questions, or online exam questions, among others. Upon selecting one or more of the potential destination formats, the provider device or the client device can transmit a message that indicates each of the selected potential destination formats to the educational content system. The educational content system can receive the message and parse the selection of the one or more selected destination formats.

In some implementations, the educational content system can determine a destination format based on a device type of a client device that requests media content from the educational content system. For example, one or more of the client devices can transmit a request to the educational content system that requests a specific item of the media content, such as a practice question. The request can include the type of device that is requesting the media content. The type of the device can include the display capabilities (e.g., display resolution, etc.) of the client device and the display context (e.g., web browser, native application, etc.) where the requested media content is to be displayed.

The educational content system can determine whether the content is compatible with a format (DECISION 408). For example, the educational content system can compare the initial formatting rules of the media content to the formatting requirements of the destination format. If the initial formatting rules (e.g., a default font type-face and size, etc.) are compatible with the destination format as-is, then modification of the formatting rules to satisfy the formatting requirements of the destination format may not be necessary. For example, if the default size of an image in the media content fits within the formatting regions of an information resource having the destination format, then the educational content system can determine that the media content is compatible with the destination format, and can proceed to execute STEP 412. In contrast, if the educational content system determines that any portion (e.g., image, text, video, audio, etc.) does not satisfy the formatting requirements of the destination format, the educational content system can proceed to execute STEP 410, to modify the formatting rules to be compatible with the destination format.

The educational content system can modify each item of media content (STEP 410). The educational content system can modify the initial formatting rules for the media content based on the formatting requirement of the one or more destination formats identified by the educational content system. To do so, the educational content system can generate modified formatting rules that override (e.g., have a greater priority level than, etc.) other formatting rules for the media content. As described herein above, each destination format (e.g., formats of the various types of information resources described herein, etc.), can have certain formatting requirements. For example, a page of an electronic textbook can have predetermined page dimensions, and can have a predetermined region for rendering media content. To accommodate such formatting requirements, the educational content system can generate formatting rules that supersede the initial user-specified formatting rules determined by the educational content system.

In some implementations, the educational content system can modify the initial formatting rules for the media content based on presentation capabilities of the device type on which the media content will be presented. For example, the presentation capabilities can indicate a maximum horizontal resolution and a maximum vertical resolution of content displayed on the device. To accommodate these capabilities, the educational content system can modify the initial formatting rules by generating an additional formatting rule for the media content that has a priority value that supersedes that of the initial formatting rules. The additional formatting rules can modify the presentation attributes of the media content (e.g., the width/height of images, the font size, character spacing of text, etc.) to fit within the constraints of the device that will be displaying the media content. The modified formatting rules can be stored in association with an identifier of the device.

In some implementations, the educational content system can modify the initial formatting rules for the media content based on minimum and maximum values of the presentation attributes (e.g., of a range of possible values of the presentation attributes, etc.) for the media modalities (e.g. each portion of media content, etc.) present in the media content. The minimum and maximum values for a particular modality can be a predetermined range of practical values for the presentation attributes of the portions of media content. These values can be stored in association with an identifier of the particular modality. For example, a minimum font size can be a 6-point font, because font sizes smaller than 6-point font are practically unreadable. Likewise, a maximum font size can be 72-point font, because larger fonts would otherwise obscure other portions of the media content. It should be understood that different ranges for a presentation attribute of the media content can be established for different presentation contexts (e.g., different types of information resources, etc.). Although the above example describes the maximum and minimum values for font size, it should be understood that minimum and maximum values can be determined for any type of presentation attribute of any media content type (e.g., any media modality such as videos, images, audio, etc.) as described herein.

The minimum and maximum values for a presentation attribute of the media content presentation context (e.g., destination format, etc.) can be considered as part of the formatting requirements of that presentation format. However, in some implementations, the range of possible presentation for a particular type of media content can be discrete, and thus have a limited set of values that can be chosen for a given destination format. In such circumstances, the educational content system can select one of the presentation attributes in the range defined by the minimum and the maximum values of the presentation attributes based on the formatting requirements of the destination format. For example, if the destination format is a web page that will be displayed on a mobile device, the educational content system can modify the initial formatting rules by adding an additional formatting rule with a higher priority for that destination format (e.g., presentation context, etc.). The additional formatting rules can specify that the presentation attribute should be modified to the selected value within the range defined by the minimum and maximum values of the presentation attribute when the particular media content 270 is displayed in the destination format. The educational content system can perform such operations for one or more of the media modalities (e.g., content types, etc.) present in the media content.

In another example, the educational content system can modify the initial formatting rules for images, such that the presentation attributes (e.g., image width, image height, etc.) of one or more images in the media content. For example, the educational content system can modify the initial formatting rules for the media content by determining an adjusted size for the one or more images in the media content. To do so, the educational content system can access the formatting requirements for the destination format, and identify at least one of a maximum possible height for the image or a maximum possible width for the image. For example, if the preliminary layout information specified when the media content was provided to the educational content system indicates that an image can occupy the maximum width of the destination format (e.g., occupy the width of a page of a textbook, a powerpoint slide, etc.), the educational content system can modify the formatting rules by adding an additional formatting rule (with a greater priority than the other formatting rules for that destination format) that specifies the width of the image to be equal to the maximum possible width for that destination format. To properly communicate the information in the image, the educational content system can also perform similar operations (e.g., adding an additional formatting rule as described herein, etc.) to also modify the height of the image to maintain the aspect ratio of the image. The educational content system can determine the aspect ratio of the image by accessing the original dimensions of the image, as indicated in the media content stored in the database.

In some implementations, the educational content system can utilize a regression model to modify the initial formatting rules for the media content. The regression model can be, for example, a linear regression model, a logistic regression model, a ridge regression model, a lasso regression model, a polynomial regression model, or a Bayesian regression model, among others. The educational content system can take, as input to the regression model, the default presentation attributes of the media content (e.g., font size, image width, image height, etc.), as well as any initial formatting rules (e.g., any specified by the user at upload time, etc.), and any formatting requirements or constraints of the destination format, such as the overall destination format width and height.

In some implementations, the educational content system can generate composite formatting rules, which can include formatting rules for more than one portion of media content. For example, if more than one item of media content can be specified on a single information resource (e.g., two practice questions on a single page of an electronic textbook, etc.), the educational content system can generate formatting rules for more than one item of the media content. To do so, the educational content system can identify second media content having second initial formatting rules, for example, based on a request to generate an information resource that includes at least two items of media content received from the provider device or the client device. Each item of media content that is to be included in the information resource can be associated with initial formatting rules for the presentation attributes of the media content. Using the initial formatting rules of each item of media content, the educational content system can generate composite formatting rules using a regression model similar to that described herein above in connection with FIG. 3. The regression model can take, as input, the default presentation parameters of each item of media content, any initial formatting rules that modify those presentation parameters, and the formatting requirements of the destination resource. The regression model can provide as output the optimal height (or other dimensions) of each item of the media content, such that each of the items of media content can be presented on the destination information resource concurrently without losing or obscuring any information in the media content. Thus, the educational content system can Using the optimal dimensions for each item of media content, the educational content system can generate composite formatting rules for the media content and the destination information resource. For example, the educational content system can identify, based on the output of the regression model, a first portion of the composite formatting rules corresponding to a first item of media content (e.g., first optimal presentation attributes such as size, etc.), and a second portion of the composite formatting rules corresponding to the second media content (e.g., second optimal presentation attributes such as size, etc.). The composite formatting rules can include a combination of formatting rules for each item of media content when the media content is displayed with other items of media content specified in the composite formatting rules. In general, the composite formatting rules can specify the size and relative position of multiple items of media content when the media content is presented in the destination information resource.

The educational content system can generate an information resource (STEP 412). The educational content system can generate an information resource that includes media content specified by the provider device or the client device. As described herein, the information resource can be any sort of resource that displays information, such as presentation slides, word-processing documents, flash cards, online quiz questions, online exam questions, online practice questions, electronic textbook pages, or printable textbook pages, among others. The information resources can be generate by parsing the formatting rules, which can be stored as a generic markup language that specifies different parameters of the media content, such as display position, display size, and other rendering information, and translate the generic markup language into an information that is suitable for an information resource. For example, Word processing documents can utilize XML markup to specify how content is displayed in word-processing documents. The educational content system can identify, or each presentation attribute of a given portion of the media content, each formatting rule having the highest priority, and translate that formatting rule into suitable XML or other language suitable for the format of the destination information resource. The educational content system can perform such functionality for each item of the media content until the information resource has been populated as desired.

In some implementations, the educational content system can generate the information resource to include all of the media content specified in composite formatting rules, which as described herein above, specify formatting rules for multiple items of media content that appear on a single information resource. To do so, the educational content system can perform similar processing steps, but apply the composite formatting rules to each item of the media content that is to appear on the destination information resource. In general, certain destination information resources may include multiple display portions (e.g., multiple pages in a word document, etc.). In such circumstances, the educational content system can generate the information resource to include as many pages or portions necessary to display each item of the media content efficiently according to the composite formatting rules. The educational content system can repeat each of the processes identified above for each of the information resources requested by the provider device or the client device, as described herein above. Upon generating the information resources, the educational content system can store each of the information resources in association with the media content forming a part of the information resources in the database.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as the educational content system 205 can include clients and servers. For example, the educational content system 205 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML, page) to a client device (e.g., for purposes of displaying data to and receiving input from a user interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the educational content system 205 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for generating and formatting multiple teaching media, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A method of generating and formatting multiple teaching media, comprising:
    receiving, by one or more processors coupled to memory, from a client computing device, media content comprising one or more media modalities each having a presentation attribute;
    determining, by the one or more processors, initial formatting rules for the media content based on the presentation attribute of each of the one or more media modalities;
    identifying, by the one or more processors, a destination format for the media content, the destination format comprising a formatting requirement for each of the one or more media modalities;
    modifying, by the one or more processors, the initial formatting rules for the media content based on the formatting requirement of the destination format to create modified formatting rules; and
    generating, by the one or more processors, an information resource having the destination format based on the modified formatting rules for the media content.

2. The method of claim 1, wherein identifying the destination format for the media content comprises:
    transmitting, by the one or more processors, a set of potential destination formats to the client computing device; and
    receiving, by the one or more processors from the client computing device, a selection of the destination format from the set of potential destination formats.

3. The method of claim 1, wherein determining the initial formatting rules for the media content further comprises:
    identifying, by the one or more processors, a respective portion of the media content corresponding to each of the one or more media modalities; and
    determining, by the one or more processors, the initial formatting rules for the respective portion corresponding to each of the one or more media modalities based on a context specified by the client computing device.

4. The method of claim 1, wherein the media content comprises one or more images, and wherein modifying the initial formatting rules for the media content further comprises determining, by the one or more processors, an adjusted size for the one or more images based on the formatting requirement and an original size of the one or more images.

5. The method of claim 1, wherein identifying the destination format further comprises:
    determining, by the one or more processors, a device type on which the destination format will be presented; and
    modifying, by the one or more processors, the initial formatting rules for the media content based on presentation capabilities of the device type on which the destination format will be presented.

6. The method of claim 1, wherein the media content specifies preliminary layout information of a plurality of portions of the media content, and wherein determining the initial formatting rules is further based on the preliminary layout information.

7. The method of claim 1, further comprising:
    identifying, by the one or more processors, second media content associated with second formatting rules and a second presentation attribute, the second media content specified for inclusion in the information resource;
    generating, by the one or more processors, composite formatting rules for the information resource based on the media content and the second presentation attribute and one or more attributes of the information resource; and
    generating, by the one or more processors, the information resource to include the media content and the second media content based on the composite formatting rules.

8. The method of claim 7, wherein generating the composite formatting rules further comprises:
    providing, by the one or more processors, as input to a regression model, the presentation attribute of each of the one or more media modalities, the one or more attributes of the information resource, and the second presentation attribute of the second media content; and
    identifying, by the one or more processors, as an output of the regression model, a first portion of the composite formatting rules corresponding to the media content, and a second portion of the composite formatting rules corresponding to the second media content.

9. The method of claim 1, wherein at least one of the one or more media modalities is an image and the presentation attribute of the image is an image size, and wherein modifying the initial formatting rules for the media content comprises modifying the image size of the image based on the destination format and other content in the information resource.

10. The method of claim 1, wherein modifying the initial formatting rules for the media content comprises:
   determining, by the one or more processors, maximum and minimum values for the presentation attribute of the one or more media modalities; and
   selecting, by the one or more processors, an updated value of the presentation attribute of the one or more media modalities based on the formatting requirement.

11. A system for generating and formatting multiple teaching media, comprising:
   one or more processors coupled to memory, the one or more processors configured to:
      receive, from a client computing device, media content comprising one or more media modalities each having a presentation attribute;
      determine initial formatting rules for the media content based on the presentation attribute of each of the one or more media modalities;
      identify a destination format for the media content, the destination format comprising a formatting requirement for each of the one or more media modalities;
      modify the initial formatting rules for the media content based on the formatting requirement of the destination format to create modified formatting rules; and
      generate an information resource having the destination format based on the modified formatting rules for the media content.

12. The system of claim 11, wherein the one or more processors are further configured to identify the destination format for the media content by:
   transmitting a set of potential destination formats to the client computing device; and
   receiving, from the client computing device, a selection of the destination format from the set of potential destination formats.

13. The system of claim 11, wherein the one or more processors are further configured to determine the initial formatting rules for the media content by:
   identifying a respective portion of the media content corresponding to each of the one or more media modalities; and
   determining the initial formatting rules for the respective portion corresponding to each of the one or more media modalities based on a context specified by the client computing device.

14. The system of claim 11, wherein the media content comprises one or more images, and wherein the one or more processors are further configured to modify the initial formatting rules for the media content by determining an adjusted size for the one or more images based on the formatting requirement and an original size of the one or more images.

15. The system of claim 11, wherein the one or more processors are further configured to identify the destination format by:
   determining a device type on which the destination format will be presented; and
   modifying the initial formatting rules for the media content based on presentation capabilities of the device type on which the destination format will be presented.

16. The system of claim 11, wherein the media content specifies preliminary layout information of a plurality of portions of the media content, and wherein the one or more processors are further configured to determine the initial formatting rules further based on the preliminary layout information.

17. The system of claim 11, wherein the one or more processors are further configured to:
   identify second media content associated with second formatting rules and a second presentation attribute, the second media content specified for inclusion in the information resource;
   generate composite formatting rules for the information resource based on the media content and the second presentation attribute and one or more attributes of the information resource; and
   generate the information resource to include the media content and the second media content based on the composite formatting rules.

18. The system of claim 17, wherein the one or more processors are further configured to generate the composite formatting rules by:
   providing, as input to a regression model, the presentation attribute of each of the one or more media modalities, the one or more attributes of the information resource, and the second presentation attribute of the second media content; and
   identifying, as an output of the regression model, a first portion of the composite formatting rules corresponding to the media content, and a second portion of the composite formatting rules corresponding to the second media content.

19. The system of claim 11, wherein at least one of the one or more media modalities is an image and the presentation attribute of the image is an image size, and wherein the one or more processors are further configured to modify the initial formatting rules for the media content by modifying the image size of the image based on the destination format and other content in the information resource.

20. The system of claim 11, wherein the one or more processors are further configured to modify the initial formatting rules for the media content by:
   determining maximum and minimum values for the presentation attribute of the one or more media modalities; and
   selecting an updated value of the presentation attribute of the one or more media modalities based on the formatting requirement.

* * * * *